UNITED STATES PATENT OFFICE 2,187,353

LUBRICATION

Arthur Walther Lewis, Elizabeth, N. J., assignor to Tide Water Associated Oil Company, Bayonne, N. J., a corporation of Delaware No Drawing. Application December 16, 1936, Serial No. 116,115

21 Claims. (Cl. 87—9)

This invention relates to lubricants intended for service in the lubrication of internal combustion engines. The invention more particularly is concerned with lubricating or motor oils of mineral hydrocarbon origin which are normally corrosive toward bearing metal alloys of the character of cadmium-silver, cadmium-nickel, or copper-lead; and has, for an important objective, the inhibition or prevention of deterioration of such bearing metal in service by the corrosive action of the lubricant thereon.

Engine bearings comprising or surfaced with cadmium-silver or like alloys now are frequently employed in lieu of the more usual Babbitt metal bearings, in order to cope with extreme service conditions of friction and temperature. These conditions are the consequences of modern developments in internal combustion engines making available high sustained speeds and requiring bearings formed of metals or alloys having greater resistance to wear, and further characterized by higher melting points necessary to prolonged life under the extreme thermal conditions existing during operation of the engine. Temperatures at the bearing surfaces during operation are much higher in the case of engines requiring these new bearings than formerly was the circumstance with engines in which Babbitt metal bearings gave satisfactory service.

Experience with bearings of the character or type exemplified by cadmium-silver, cadmium-nickel and copper-lead alloys has demonstrated, however, that their utility is greatly impaired by an extreme susceptibility to rapid deterioration by the corrosive action or effect of many available lubricating oils. Particularly has this effect been noted when the oils are of the character generally regarded as superior lubricants by conventional criteria.

Little is known concerning the nature of the corrosive action or its causes; but in general it has been observed that motor oils derived from selected crudes predominantly paraffinic in origin, as well as those oils from these or other crudes which have been improved by treatment with selective solvents, exhibit a marked tendency toward corrosion of the bearings in question, although by other tokens the lubricant is of superior quality. Oxidation stability, as indicated by sludge or acid formation in conventional tests indicative of the tendency toward deterioration of the oil itself in service, does not appear to have reliable correlation with the tendency of the oil to corrode bearing surfaces. It is possible that the high bearing surface temperatures existing under service conditions with the new bearings may be a factor in occasioning the observed deleterious effect of motor oils thereupon. It would appear, also, that the problem of bearing corrosion, with which the present invention is particularly concerned, contrasts with problems of lubricant deterioration per se, since oils characterized by long life and good stability may be just as corrosive as those of inferior grade. No theory in explanation of the observed corrosive action or the prevention thereof, as herein proposed according to the invention, is intended to be relied upon.

According to the present invention, it has now been found that the corrosive effect of lubricating oils upon bearing surfaces of the character referred to above may be avoided in novel and effective manner by incorporating with such oils particular compounds having a retarding or inhibiting effect in respect of such corrosion. More specifically, the invention arises from the discovery that a compound comprising a tolylene diamine effects a very beneficial retardation of the corrosive action of internal combustion engine lubricating oils upon cadmium-silver, cadmium-nickel, copper-lead and like bearing metal alloys.

It is, therefore, an important object of the present invention to inhibit or retard the corrosive deterioration of cadmium-silver and like bearing metal alloys in automotive service by providing a lubricant therefor comprising a refined mineral hydrocarbon oil having incorporated therewith a tolylene diamine in small but effective proportion. Likewise, it is an object of the invention to improve, and to prepare improved, motor oils of petroleum origin by incorporating therein a tolylene diamine in corrosion inhibiting proportions. The provision of an inhibitor effective for such purpose and comprising a compound as aforesaid naturally is a major objective.

The use of various organic compounds for addition in quite small proportion to petroleum products of various types and intended for various services has been proposed heretofore. Inhibitors have been incorporated in cracked gasolene for the purpose of retarding or preventing gum formation; while in the separate class of petroleum fractions comprising lubricating oils various compounds have been used with benefit in preventing oil deterioration in such services as are furnished by turbine oils, transformer oils, motor oils, and the like. These prior uses of inhibitors have been attended with discrepancies in results, some inhibitors being markedly effective for one purpose, while wholly or substantially without benefit for another. In many cases a compound showing inhibitive characteristics in one oil environment acts as an accelerator of deterioration in another. Further, it has been observed that no necessary or reliable correlation seems to exist between the effectiveness of an inhibitor in preventing oil deterioration per se and the effectiveness of the same inhibitor in preventing deleterious consequences, such as bearing corrosion, resulting from the service use of lubricating oils.

It is a beneficial characteristic of inhibitors provided by the present invention that not only is the corrosive action of motor oils toward cadmium-silver and like bearings retarded but deterioration of the oil itself in such service likewise is retarded as a result of the presence of the inhibitor.

Viewed in another aspect, the invention may be regarded as encompassing a novel method of lubricating bearing metal surfaces, of the character of cadmium-silver, cadmium-nickel, copper-lead or like alloys, by applying thereto a film of lubricant comprising mineral hydrocarbon oil having incorporated therewith a small but effective proportion of a tolylene diamine. With this method of lubrication it has been found that prolonged life and consequent improved service may be attained in the use of these alloys as bearing metals for internal combustion engines, particularly when operating conditions such as high sustained speeds under load occasion unusually high bearing surface temperatures. Ordinarily, the oil selected for use, in applying the lubricating method of the invention to its intended service, will be of a character generally regarded as of superior grade and refining. Thus, the invention finds particular utility in making possible the beneficial use of such oils by avoiding deleterious consequences otherwise encountered when no preventive measures are taken against the corrosive deterioration of bearing metal alloys as hereinbefore referred to. It will be understood, however, that the invention contemplates no limitation in this respect, and that the method of lubrication herein described may be practiced in conjunction with mineral hydrocarbon lubricating oils taken as a broad class and regardless of origin.

The tolylene diamines are single ring compounds having a benzene nucleus to which are attached two amine groups and one methyl group. The ortho-, meta- and para-compounds are known and all fall within the contemplated scope and practice of the present invention. The structure of these compounds in their various isomeric forms is illustrated by meta-tolylene diamine. Three of these occur, namely, 2-m-tolylene diamine which in the pure state is a solid melting at 105° C., 4-m-tolylene diamine which in the pure state is a solid with a melting point of 99° C. and a boiling point of 280° C., and 5-m-tolylene diamine which in the pure state is a liquid having a boiling point of 285° C. The three isomers just referred to conform to the following structural formulae:

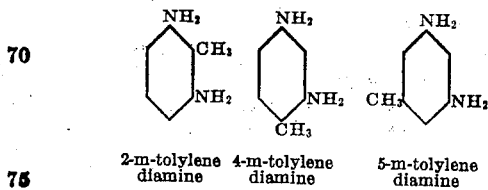

2-m-tolylene diamine    4-m-tolylene diamine    5-m-tolylene diamine

The commercial product marketed as meta-tolylene diamine probably contains all three of the foregoing isomers, and, as is shown by the illustrative examples hereinafter presented, may be used with advantage in the practice of the present invention.

Solubility of tolylene diamine in mineral hydrocarbon oil of motor lubricating oil character is limited, but the proportion necessary to accomplish the objects of the present invention is well within the limits of solubility. It suffices, therefore, simply to dissolve a tolylene diamine (if desired with moderate application of heat to facilitate solution) in motor oil intended for service in internal combustion engines in order to prepare for the lubrication thereof according to the invention. Proportions of less than 0.2% by weight of the inhibitor dissolved in motor oil are shown hereinafter to be markedly inhibitive of the corrosion normally attending the use of many lubricating oils with bearing metals of the type comprising cadmium-silver and like alloys. The stated percentage is not intended as a limitation upon the contemplated scope and practice of the invention, as obviously the inhibitor may be, and is intended to be, employed in any corrosion inhibiting proportion.

The tendency of motor oils to corrode bearings of the character in question may be determined by a convenient test which affords a ready method of obtaining a comparative evaluation of motor oils in the laboratory. In this test method a group of bearings, ordinarily including at least one each of several of the newer bearing metal alloys (viz: cadmium-silver, cadmium-nickel and copper-lead) is supported in a chamber in which air may circulate and the bearing surfaces are exposed for a period of 22 hours to a stream of oil sprayed under pressure continuously upon the corrodible area. The oil is maintained at a temperature of approximately 335° F. and the spray is so directed as to disperse the oil over the surfaces of the bearings. Means are provided for re-circulating the sprayed oil so that a given quantity is used for a given test, thus simulating service conditions in an engine. The measure of corrosion is taken as the loss in weight of the bearing per unit of exposed corrodible surface.

The test method described above is carried out in the familiar Underwood corrosion apparatus supplied by the Scientific Instrument Company of Detroit, Michigan, in accordance with General Motors specifications.

Results obtained utilizing the foregoing test for comparative evaluation of motor oils with and without an inhibitor according to the invention provide specific illustration of the value and inhibiting effectiveness of tolylene diamines. The oil used for the test was an S. A. E. 20 motor oil comprising a blend of solvent refined Pennsylvania neutral oil with a conventionally produced Pennsylvania bright stock and having an A. P. I. gravity of 30.1, Saybolt viscosity at 100° F. of about 300 seconds, Saybolt viscosity at 210° F. of 54 seconds and flash point of 425° F. In view of the limited solubility of tolylene diamines in motor oils, a saturated solution was prepared by stirring into one portion of the oil an amount of commercial meta-tolylene diamine equivalent to 0.2% by weight based on the oil, permitting the excess to settle and draining off a saturated solution. The oil was warmed to facilitate dissolving the compound therein. During each run cadmium-silver, cadmium-nickel and copper-lead bearings all were present; and comparative losses in weight per square decimeter due to corrosion were observed as follows for the respective bearings:

| Bearing | Oil blank | Oil plus tolylene diamine |
|---|---|---|
| | Grams | |
| Cadmium-silver | 11.4 | No loss. |
| Cadmium-nickel | 9.7 | Do. |
| Copper-lead | 5.7 | Do. |

The above illustrative example clearly demonstrates the efficacy of a tolylene diamine in occasioning effective retardation of bearing corrosion normally resulting from the use of internal combustion engine motor oil with bearings of the type described. Tests on the used oil following each of the foregoing runs evidenced the further utility of inhibitors according to the invention in reducing deterioration of the oil itself. Thus, used oil from the run in which no inhibitor was present was found to have undergone an 82% increase in viscosity at 210° F. and an increase in carbon residue from less than 0.4 to 5.01. The neutralization number of the used oil from the blank run was 7.56 milligrams KOH per gram of oil.

Comparative tests on the used oil after the reported run in which meta-tolylene diamine was present showed a viscosity increase of but 4%, an increase in carbon residue from less than 0.4 to but 0.89, and a neutralization number of 0.94 milligram KOH per gram of oil. The beneficial effect of the inhibitor as regards relative oil deterioration is clearly evidenced.

I claim:

1. The method of lubricating bearings having substantially the corrosion susceptibility characterizing cadmium-silver, cadmium-nickel and copper-lead alloys, which consists in applying to the bearing surfaces lubricant comprising mineral hydrocarbon oil of a character normally tending to corrode said bearing surfaces and having incorporated therein a tolylene diamine in proportion effective to inhibit corrosion of said bearing surfaces during the lubrication thereof.

2. The method of claim 1, further characterized in that the added tolylene diamine is incorporated with the lubricant in proportions of less than 0.2% by weight.

3. The method of claim 1, further characterized in that the added tolylene diamine is incorporated with the lubricant in proportions sufficient to give a saturated solution.

4. The method of claim 1, further characterized in that the added tolylene diamine is a meta-tolylene diamine.

5. The method of lubricating bearing surfaces in internal combustion engines, which bearing surfaces comprise an alloy having substantially the corrosion susceptibility characterizing cadmium-silver, cadmium-nickel, and copper-lead alloys, which consists in applying to said bearing surfaces lubricant comprising mineral hydrocarbon oil of a character normally tending to corrode said bearing surfaces and having incorporated therein corrosion inhibiting proportions of a tolylene diamine.

6. The method of lubricating bearing surfaces in internal combustion engines, which bearing surfaces comprise an alloy having substantially the corrosion susceptibility characterizing cadmium-silver, cadmium-nickel, and copper-lead alloys, which consists in applying to said bearing surfaces lubricant comprising mineral hydrocarbon oil of a character normally tending to corrode said bearing surfaces and having incorporated therein corrosion inhibiting proportions of a meta-tolylene diamine.

7. The method of claim 5, further characterized in that the added tolylene diamine is incorporated with the lubricant in proportions of less than 0.2% by weight.

8. The method of claim 6, further characterized in that the added meta-tolylene diamine is incorporated with the lubricant in proportions of less than 0.2% by weight.

9. In the lubrication of bearing surfaces, one of which is formed of an alloy having substantially the corrosion susceptibility characterizing cadmium-silver, cadmium-nickel, and copper-lead alloys, with mineral hydrocarbon oil normally tending to cause substantial and rapid corrosion thereof, the method of inhibiting such corrosion which comprises incorporating with said oil corrosion inhibiting proportions of a tolylene diamine.

10. In the lubrication of bearing surfaces, one of which is formed of an alloy having substantially the corrosion susceptibility characterizing cadmium-silver, cadmium-nickel, and copper-lead alloys, with mineral hydrocarbon oil normally tending to cause substantial and rapid corrosion thereof, the method of inhibiting such corrosion which comprises incorporating with said oil corrosion inhibiting proportions of a meta-tolylene diamine.

11. The method of claim 9, further characterized in that the added tolylene diamine is incorporated with the lubricant in proportions of less than 0.2% by weight.

12. The method of claim 10, further characterized in that the added meta-tolylene diamine is incorporated with the lubricant in proportions of less than 0.2% by weight.

13. Mineral oil composition free of added material having the instability inducing effect of added rubber, and consisting of a hydrocarbon lubricating oil of motor oil character normally tending to corrode bearing metal having substantially the corrosion susceptibility characterizing cadmium-silver, cadmium-nickel and copper-lead alloys when continuously applied to the surface thereof for an extended period of time at an oil temperature of 335° F., and a tolylene diamine incorporated with said oil in corrosion inhibiting proportions.

14. Mineral oil composition free of added material having the instability inducing effect of added rubber, and consisting of a hydrocarbon lubricating oil of motor oil character normally tending to corrode bearing metal having substantially the corrosion susceptibility characterizing cadmium-silver, cadmium-nickel and copper-lead alloys when continuously applied to the surface thereof for an extended period of time at an oil temperature of 335° F., and meta-tolylene diamine incorporated with said oil in corrosion inhibiting proportions.

15. The composition of claim 13, further characterized in that the added tolylene diamine is incorporated with the lubricant in proportions of less than 0.2% by weight.

16. The composition of claim 14, further characterized in that the added meta-tolylene diamine is incorporated with the lubricant in proportions of less than 0.2% by weight.

17. A lubricant free of added material having the instability inducing effect of added rubber and adapted for the lubrication of internal combustion engines operating at high sustained speeds and employing bearings presenting bearing surfaces of an alloy selected from the class of cadmium-silver, cadmium-nickel, and copper-lead alloys, which consists of a well-refined mineral lubricating oil of the character normally effective to cause substantial corrosion of such bearing surfaces, and added tolylene diamine incorporated with said oil in corrosion inhibiting proportions.

18. A lubricant free of added material having the instability inducing effect of added rubber and adapted for the lubrication of internal combustion engines operating at high sustained speeds and employing bearings presenting bearing surfaces of an alloy selected from the class of cadmium-silver, cadmium-nickel, and copper-lead alloys, which consists of a well-refined mineral lubricating oil of the character normally effective to cause substantial corrosion of such bearing surfaces, and added meta-tolylene diamine incorporated with said oil in corrosion inhibiting proportions.

19. The lubricant of claim 17, further characterized in that the added tolylene diamine is incorporated with the lubricant in proportions of less than 0.2% by weight.

20. The lubricant of claim 18, further characterized in that the added meta-tolylene diamine is incorporated with the lubricant in proportions of less than 0.2% by weight.

21. Mineral oil composition free of added material having the instability inducing effect of added rubber, and consisting of a hydrocarbon lubricating oil of a character normally tending to corrode bearing metal having substantially the corrosion susceptibility characterizing cadmium-silver, cadmium-nickel, and copper-lead alloys when continuously applied to the surface thereof under service conditions, and a tolylene diamine incorporated with said oil in corrosion inhibiting proportions.

ARTHUR WALTHER LEWIS.